United States Patent

Hargest

[11] B 3,929,130
[45] Dec. 30, 1975

[54] METHOD FOR LYMPHOCYTE DEPLETION

[76] Inventor: Thomas S. Hargest, 1078 Winslow Drive, Charleston, S.C. 29412

[22] Filed: Oct. 30, 1972

[21] Appl. No.: 302,271

[44] Published under the Trial Voluntary Protest Program on January 28, 1975 as document no. B 302,271.

[52] U.S. Cl........ 128/214 R; 210/24; 210/DIG. 23; 210/290
[51] Int. Cl.².................. A61M 01/03; A61M 05/00
[58] Field of Search............ 128/213, 214 R, 214 C, 128/214 Z, 1 R; 210/22, 23, 94, 95, 283, 24, 285, 290, DIG. 23

[56] References Cited
UNITED STATES PATENTS

| | | | |
|---|---|---|---|
| 2,222,123 | 11/1940 | Schwab | 128/214 R |
| 2,682,268 | 6/1954 | Ryan et al | 23/258.5 |
| 3,448,041 | 6/1969 | Swank | 210/23 |
| 3,492,396 | 1/1970 | Dalton et al | 128/290 X |
| 3,511,238 | 5/1970 | Von Wrangell | 128/214 R |
| 3,593,854 | 7/1971 | Swank | 210/436 |
| 3,701,433 | 10/1972 | Krakauer et al | 128/214 C X |
| 3,719,182 | 3/1973 | Rose | 128/214 R X |

OTHER PUBLICATIONS

Weinstein et al., – T. Amer. Soc. Art. Inter. Orgs., Vol. XII, 1966, pp. 26–32.

*Primary Examiner*—Dalton L. Truluck
*Attorney, Agent, or Firm*—Dawson, Tilton, Fallon & Lungmus

[57] ABSTRACT

A closed-circuit lymph filtering method for reducing the number of lymphocytes in the body of a living vertebrate. The method includes circulating lymph at a controlled rate through a column containing a mass of inert microparticles of irregular shape, such as finely-crushed glass.

10 Claims, 2 Drawing Figures

METHOD FOR LYMPHOCYTE DEPLETION

BACKGROUND

Lymphocyte depletion has been recognized in recent years as an improved method of immunosuppression, as reported by Fish, et al., Surg., Vol. 65, p. 789 (1969), Graber, et al., Ann. Surg., Vol. 171, p. 241 (1970), Joel, et al., Proc. Soc. Exp. Bio. Med., Vol. 112, p. 856 (1963), Joel, et al., Am. J. Physiol., Vol. 213, p. 573 (1967), and Tilney, et al., Ann. Intrn. Med., Vol. 72, p. 59 (1970). Various techniques have been reported for lowering lymphocyte levels, including lymphocyte destruction as a secondary effect of extracorporeal dialysis [Sarles, et al., New Eng. J. Med., Vol. 273, p. 79 (1965)], extracorporeal centrifugation [Fish, et al., supra], and extracorporeal radiation of thoracic duct lymph. Although such techniques have had limited success they also have certain inherent problems associated with their implementation. Radiation presents problems of possible over-exposure and mutation of the lymphocytes. Dialysis and centrifugation are both extremely burdensome to accomplish and processed lymph may become contaminated resulting in an infection to the patient.

SUMMARY

An object of the present invention is to provide a relatively simple method for lowering lymphocyte levels while at the same time avoiding the disadvantages and shortcomings of prior techniques. Specifically, it is an object to provide an effective closed-circuit system for processing or filtering lymph obtained by cannulation of a major lymph duct (thoracic duct) of a living vertebrate, thereby reducing the lymphocyte levels circulating through the body. A still further object is to provide a simple, economical, and highly effective filter or treatment column through which the lymph of a living animal (including human beings) may be circulated to deplete the lymphocyte content thereof.

The filtering media of the column consists essentially of finely-crushed glass, although other non-toxic, biologically inert and highly frangible materials might conceivably be used. The glass microparticles should be irregular or non-spherical in shape and should be of a size within the general range of 37 to 105 microns (corresponding to U.S. mesh sizes within the range of 140 to 400 mesh). The size of the column may vary considerably depending upon the size of the subject and the lymph flow rate; however, the velocity or linear rate of flow of lymph through the column, regardless of column size, should be within the range of 12 to 20 centimeters per hour. Particularly effective results have been obtained with velocities of 15 to 18 centimeters per hour, the optimum velocity appearing to be approximately 17 centimeters per hour.

Microbiological contamination of the lymph is avoided because the components of the system are sterilized at the outset and because the system remains a closed-circuit system throughout a filtering operation. The "closed-circuit" taps into a major lymph duct, such as the thoracic duct, and returns the "filtrate" to the body by direct connection to a suitable vein or other vessel. For reasons which will appear more evident as the specification proceeds, the terms "filter" and "filtrate" are used herein in a broad sense to mean a device capable of restraining and collecting lymphocytes from lymph flowing therethrough, and the flowable vascular tissue which is thereafter returned to the body, without regard to the precise mechanism of the restraining action.

DRAWINGS

DESCRIPTION

Figure 1:
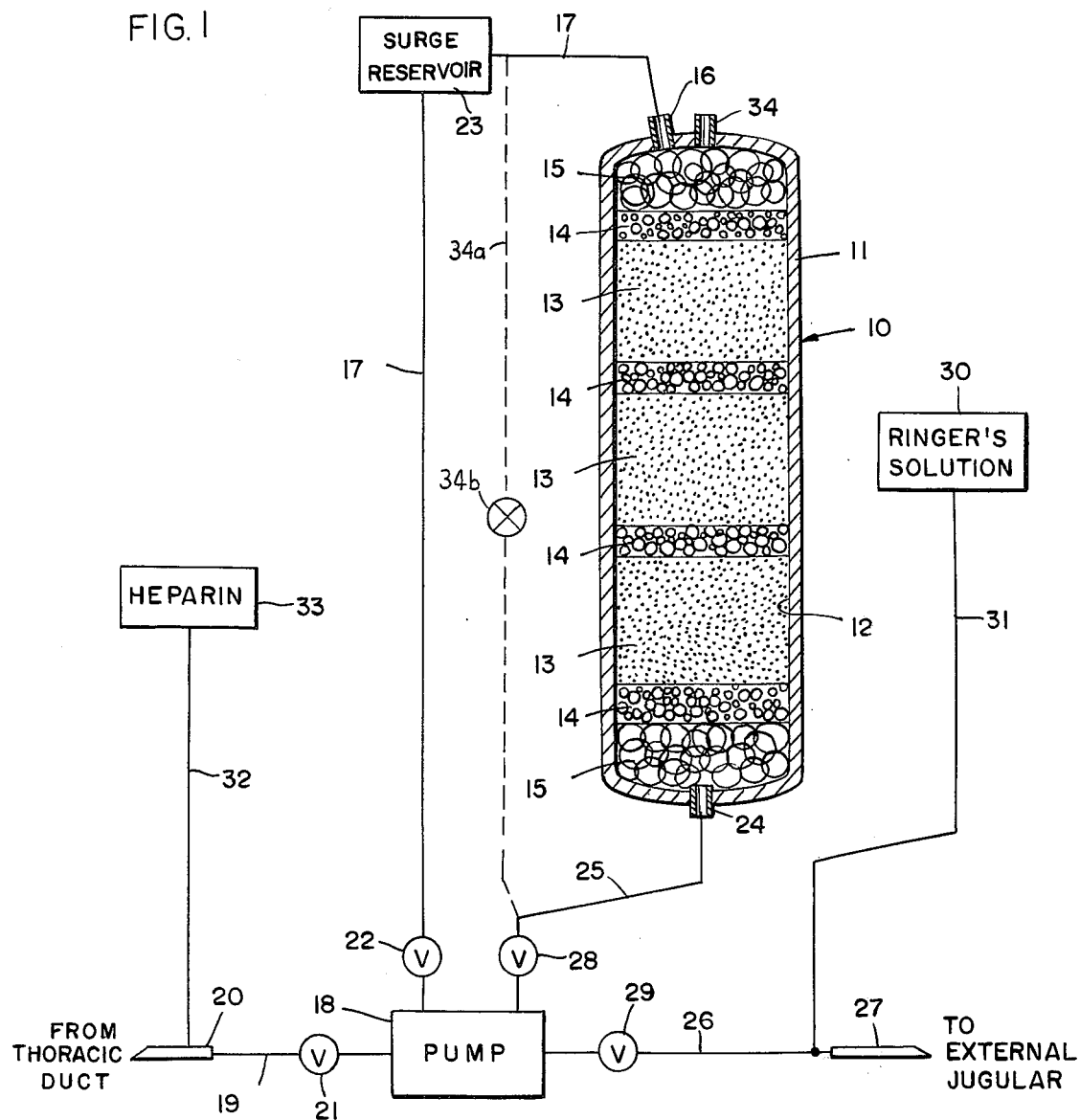
FIG. 1 is a schematic view of a closed-circuit filtration system embodying this invention.

Referring to FIG. 1, the numeral 10 generally designates a column comprising a casing 11 defining a chamber 12 and containing one or more layers 13 of finely-crushed biologically-inert glass. In the illustration given, three such layers are shown, such layers being separated by spacer layers 14 of relatively coarse inert material. The spacer layers may be formed of glass particles having sizes of 250 microns or larger and, unlike layers 13, such spacer layers perform no filtering function. They simply serve to maintain uniform distribution of flow and prevent channelling within the column. Shifting of the filtering media within the column is restrained by a suitable inert packing 15 of glass wool or any other appropriate material.

The casing 11 is generally vertically elongated and is preferably straight and cylindrical, or substantially cylindrical, in configuration. Like its contents, the casing should be formed of a material which is biologically inert and which is capable of being sterilized prior to use. Glass has been found particularly effective although it is believed apparent that other materials might be used.

An inlet 16 at the upper end of the column communicates with tubing 17 which in turn communicates with a suitable pump 18. While any of a variety of commercial pumps might be suitable, it is preferable to utilize a pump which functions on a demand basis so that no appreciable negative or positive pressure is exerted on the thoracic duct by the pump itself. Lymph enters the pump through tube 19 which extends from a suitable catheter 20 positioned within a major lymph duct of the patient or subject. For most practical purposes, such duct will be the left thoracic duct; however, it is conceivable that other ducts such as the right thoracic duct might be cannulated. Check valves 21 and 22 are interposed along lines 19 and 17 and a surge reservoir 23 is positioned along line 17 to isolate the column against any surges in flow produced by pump operation.

At its lower end, column 10 is provided with an outlet 24 which, as shown in FIG. 1, may be attached directly to tube 25 returning to pump 18 or, if desired, may communicate directly through a check valve with tubing 26. Tubing 26 leads from the pump to a suitable catheter 27 communicating with a vein such as the external jugular or subclavian vein. Check valves 28 and 29 are interposed along lines 25 and 26.

Lactated Ringer's solution containing suitable antibiotics such as penicillin and streptomycin may be continuously infused into the effluent of pump 18 by means of container 30 which communicates with line 26 through tubing 31. Similarly, heparin, or other appropriate anticoagulant, may be continuously infused into inlet line 19, or into catheter 20, by means of tubing 32 leading from container 33.

A bleed vent 34 may be provided at the upper end of the column to bleed air from chamber 12 in preparation for a filtering operation or to draw input samples from chamber 12; however, such vent may be sealed during filtration and does not in any case alter the fact that the system is an essentially closed one. It should also be noted, as represented by broken lines in FIG. 1, that a suitable bypass 34a with an appropriate clamp 34b may be provided between lines 17 and 25 so that column 10 may be replaced with a new column without interrupting operation of the other components of the system.

The ceramic or glass particles of layers 13 should be of a size within the range of approximately 37 to 150 microns or, in terms of U.S. mesh sizes, should be within the range of 140 to 400 mesh. Preferably, such particles should be within the size range of 44 to 88 microns, or 170 to 325 mesh. Of particular importance is the fact that such particles must be angular or nonspherical in configuration. Glass is particularly effective as the filtering medium not only because of its biologically inert character and its relatively high specific gravity but also because its frangibility permits it to be crushed to form particles of the desired size with angular and irregular surfaces.

All components are sterilized prior to use and the column 10 is primed with sterile lactated Ringer's solution. Catheters 20 and 27 are surgically introduced into the thoracic duct and a suitable vein, respectively. Upon operation of pump 18, lymph from the thoracic duct is directed into the surge reservoir and then by gravity into the filter column. The lymph then flows or migrates downwardly by gravity through the layer or layers 13 of filter material in the column. For effective operation of the filter, it is important that the velocity of flow through the column be controlled so that it is within the range of approximately 12 to 20 centimeters per hour, the preferred range being approximately 15 to 18 centimeters per hour. Optimum velocity of vertical rate is believed to be approximately 17 centimeters per hour. If the flow were excessively slow, the residence time of lymph within the column would reach a level where a clotting or clogging action would tend to occur, whereas excessively fast rates would produce a flushing action that would render the column inoperative as a lymphocyte filter. Control over flow velocity under the influence of gravity may be achieved by utilizing a filter of the proper size for the subject, or by adding (where necessary) one or more additional filters in parallel, or by adjusting flow through bypass 34a.

Figure 2:
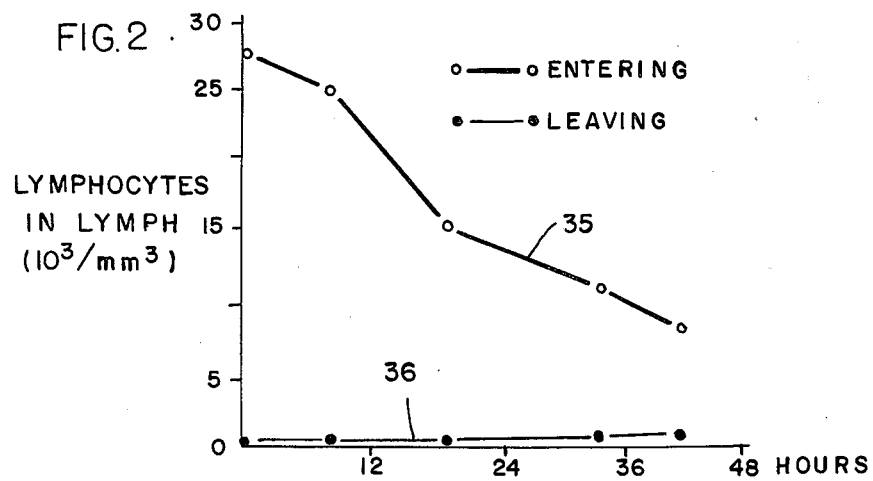
FIG. 2 is a graph illustrating the extent of lymphocyte depletion produced by such a system.

The high degree of effectiveness of the filter system in removing lymphocytes is believed apparent from the graph of FIG. 2 where line 35 indicates the number of lymphocytes per cubic millimeter entering a representative filter, and line 36 represents the number of lymphocytes leaving the filter, over a 44 hour period. The graph is illustrative of the results obtained by filtering the lymph of a series of female Hereford calves weighing 180 to 225 kilograms.

As indicated by the graph, a filtering system embodying the invention removes nearly all (well over 95 percent) of the lymphocytes from lymph passing through the filter over the effective life of such a filter. The effective life has been found to be 24 to 48 hours depending on the extent of lymphocyte depletion; however, because the flow of lymph may be impeded as the result of saturation of the filter with cells, 24 hours has been selected as the preferred operating life for such a filter.

The precise reasons for the high degree of effectiveness of the method and apparatus of this invention in achieving lymphocyte depletion are not fully known, especially in view of the apparent significance of certain requirements, such as the irregular or angular configuration of the ceramic microparticles. It has been theorized, however, that such configuration may be instrumental in promoting a settling or pooling of the lymphocytes, or that the irregularity of the surfaces may somehow contribute in directly impeding lymphocyte movement.

The invention is further illustrated by the following examples:

EXAMPLE 1

A total of eight female Hereford calves weighing 180 to 225 kilograms were cannulated and their lymph filtered in the manner described, using a Pyrex column 14 inches long with an inside diameter of 3⅛ inches. The column was filled with layers of crushed crown optical soda-lime glass sphere (Flex-O-Lite, St. Louis, Mo.) having particle sizes within the range of 44 to 88 microns, such layers being separated by spacer layers composed of crushed crown optical soda-lime glass having particle sizes within the range of 420 to 500 microns. A SCIRT pump (Bio-Medical Systems, Inc., Danbury, Connecticut) was used to pump lymph from the cannulated thoracic duct of each animal through a TA–10 transfer pack (Travenol Laboratories, Morton Grove, Ill.) which served as a surge reservoir, and then by gravity into the filter column. Prior to entering the filter, thoracic duct lymphocyte counts ranged from 14,000 to 38,000 cells per cubic millimeter while lymph flow rates ranged from 11 to 36 liters per day. Such filters were found to be 98 percent effective in the removal of lymphocytes from the lymph passing therethrough. At flow rates of about 600 cubic centimeters per hour, the filters removed approximately $4.5 \times 10^8$ cells per day. As many as $2.0 \times 10^{12}$ cells were removed from a single animal in a 5-day period, using filter columns replaced at 24 to 36 hour intervals.

Depletion of 90 percent of the measured thoracic duct lymphocyte level has been accomplished in 5 to 10 days. Once depleted, lymphocyte levels have remained substantially low, increasing gradually to 30 percent of normal in about 50 days after cessation of filtration.

EXAMPLE 2

Studies regarding the effect of filtration using the system described above showed no untoward effects. Table I reveals that there is no statistically significant difference in the sodium, potassium, pH, total protein, or lipid levels after passage of the lymph of Hereford calves through the crushed glass filters. In addition, the filters have shown no microbiological contamination of the lymph.

TABLE I

| Sample No. | K+ (mEq./L.) | | Na+ (mEq./L.) | | pH | | Protein (Gm. percent) | | Lipid (mg. percent) | |
|---|---|---|---|---|---|---|---|---|---|---|
| | Input | Output | Input | Output | Input | Output | Input | Output | Input | Output |
| 1 | 3.8 | 4.1 | 139.5 | 125.0 | 7.53 | 7.52 | 2.0 | 1.4 | 409 | 511 |
| 2 | 3.7 | 3.6 | 113.0 | 125.0 | 7.55 | 7.51 | 2.0 | 1.8 | 653 | 584 |
| 3 | 4.0 | 3.0 | 123.5 | 107.0 | 7.54 | 7.51 | 6.4 | 5.6 | 740 | 673 |
| 4 | 4.0 | 4.0 | 134.0 | 130.0 | 7.52 | 7.53 | 6.2 | 6.2 | 614 | 473 |
| 5 | 4.5 | 4.5 | 123.0 | 128.0 | 7.48 | 7.54 | 6.0 | 6.2 | 444 | 584 |
| Mean ±S.D. | 4.0± 0.3 | 3.8± 0.5 | 126.6± 10.3 | 123.0± 9.1 | 7.52± 0.02 | 7.52± 0.02 | 4.5± 0.9 | 4.2± 0.9 | 572± 126 | 565± 69 |

While in the foregoing, I have disclosed an embodiment of the invention in considerable detail for purposes of illustration, it is believe apparent to those skilled in the art that many of these details may be varied without departing from the spirit and scope of the invention.

I claim:

1. A method for removing lymphocytes from the lymph of a living vertebrate, comprising the steps of surgically redirecting the flow of lymph from a major lymph duct into a filter column containing a mass of irregularly-shaped glass microparticles having sizes within the range of about 37 to 105 microns, controlling the rate of flow of lymph through said column to maintain a velocity of approximately 12 to 20 centimeters per hour, and returning the filtrate to the vascular system without interrupting the flow thereof.

2. The method of claim 1 in which said particles have sizes within the range of 44 to 88 microns.

3. The method of claim 1 in which said velocity is maintained at 15 to 18 centimeters per hour.

4. The method of claim 3 in which said velocity is maintained at a level of approximately 17 centimeters per hour.

5. The method of claim 1 in which said lymph passes through said filter column under the influence of gravity.

6. A method for removing lymphocytes from lymph, comprising the steps of passing lymph through a filter column under the influence of gravity, said column containing essentially a mass of irregularly-shaped angular glass microparticles having sizes within the range of about 140 to 400 mesh, and controlling the rate of downward flow of lymph through said column to maintain a velocity of approximately 12 to 20 centimeters per hour.

7. The method of claim 6 in which there is the further step of injecting the lymph filtrate from said column into the vascular system of a living vertebrate.

8. The method of claim 6 in which said velocity is maintained at 15 to 18 centimeters per hour.

9. The method of claim 8 in which said velocity is maintained at approximately 17 centimeters per hour.

10. The method of claim 6 in which said microparticles have sizes within the range of about 170 to 325 mesh.

* * * * *